United States Patent
Mendoza-Sosa

(10) Patent No.: US 7,877,925 B2
(45) Date of Patent: Feb. 1, 2011

(54) METHOD AND SYSTEM FOR CULTIVATING FRUIT

(76) Inventor: Jorge Mendoza-Sosa, 3816 24th. Ave. S., Minneapolis, MN (US) 55406

( * ) Notice: Subject to any disclaimer, the term of this patent is extended or adjusted under 35 U.S.C. 154(b) by 234 days.

(21) Appl. No.: 11/953,342

(22) Filed: Dec. 10, 2007

(65) Prior Publication Data

US 2009/0145024 A1     Jun. 11, 2009

(51) Int. Cl.
*A01G 17/00* (2006.01)
(52) U.S. Cl. .................................. 47/58.1 FV; 47/24.1
(58) Field of Classification Search .................. 47/24.1, 47/29.1, 31, 31.1, 20.1, 58.1 R, 58.1 FV
See application file for complete search history.

(56) References Cited

U.S. PATENT DOCUMENTS

| | | | | |
|---|---|---|---|---|
| 3,141,832 | A * | 7/1964 | Burdick | 435/219 |
| 5,773,697 | A * | 6/1998 | Tomes et al. | 800/260 |
| 2006/0053506 | A1 * | 3/2006 | Chiu et al. | 800/260 |
| 2007/0151148 | A1 | 7/2007 | Hoch | |

OTHER PUBLICATIONS

Teixeira da Silva et al., 'Papaya (*Carica papaya* L.) Biology and Biotechnology, Nov. 2007.*

Teixeira Da Silva et al. "Papaya (*Carica papaya* L.) Biology and Biotechnology", Tree and Forestry Science and Biotechnology, Nov. 2007 Global Science Books, vol. 1, No. 1, (27 pages).
Mendoza Sosa, Jorge, "Maradol Papaya grown under plastic mesh covering: The evolution of an idea", presented to Agro Engineers, Puebla, Mexico, 2002, (10 pages, including non-certified translation).
Mendoza Sosa, Jorge, "Business Plan", Oct. 11, 2006 (54 pages, including non-certified translation, confidential, unpublished).
International Search Report mailed Mar. 3, 2009 for co-pending application PCT/US08/86071, filed Dec. 9, 2008 (3 pages).
"Tropical papaya a possibility for California small-scale farmers", University of California—Agriculture and Natural Resources, dated Jun. 2003—accessed Feb. 1, 2010 at http://ucanr.org/spotlight/papaya.shtml (2 pages).
Delgado et al., "Postharvest Behavior of Three Papaya Cultivars Produced in Mesh Greenhouse in Tenerife (Canary Islands, Spain)", Proc. 1st IS on Papaya, Eds. Y.K. Chan and R. E. Paull, Acta Hort. 740, ISHS 2007, pp. 295-302.
Sauco et al., "Greenhouse Cultivation of Papaya", Proc. 1st IS on Papaya, Eds. Y.K. Chan and R. E. Paull, Acta Hort. 740, ISHS 2007, pp. 191-195.

(Continued)

*Primary Examiner*—T. Nguyen
(74) *Attorney, Agent, or Firm*—Fredrikson & Byron P.A.

(57) ABSTRACT

A method of growing fruit such as papaya commercially, the method including the use of a structure having a covering adapted to permit sufficient light, nutrients and moisture, while substantially precluding access by potentially virus-carrying insects; together with seeds that are obtained, germinated, planted, and grown in a manner that permits plants to grow and bear seedless fruit suitable for harvest.

7 Claims, 3 Drawing Sheets

OTHER PUBLICATIONS

Delphion Search Results (cultivat* AND papaya)—accessed Jun. 11, 2008 at https://www.delphion.com/fcgi-bin/patsearch, Jun. 11, 2008 (4 pages).

Mendoza Sosa, Jorge, "Production of organic Maradol papaya for the Swiss market using antiafida mesh in the mixteca poblana", presented to Anahuac University, Puebla, Mexico 2002 (25 pages).

Duenas, Vincente, "Modernized Cultivations of Papaya Maradol", El sol de Puebla newspaper, Mexico, Sep. 11, 2002 (2 pages, including non-certified translation).

"Business and Investments in Agriculture in Puebla, Mexico, Papaya (*Carica papaya*)", flyer accompanying fruit sent to expostion, Vancouver, Canada, Feb. 2001 (1 page).

Fortunato et al., "Production of papaya "Maradol" semiecologica in conditions of cultivation protected in the mixteca poblana", Agricultural Engineering Technology Institute, No. 32, Pueblo, Mexico and Institute of Fundamental Research in Tropical Agriculture, Havana, Cuba, presented Apr. 2004 (7 pages, including non-certified translation).

* cited by examiner

METHOD AND SYSTEM FOR CULTIVATING FRUIT

TECHNICAL FIELD

The invention described below pertains to methods and systems for cultivating tropical fruits, and in particular the papaya.

BACKGROUND OF THE INVENTION

Tropical fruits such as papaya have been cultivated commercially for decades in tropical countries. In recent times but before the increased efficiency and modernization of communications and world trade, people and products in general moved from one country to another in a matter of hours. Fruits in particular, as commercial products, today move more rapidly and are available to consumers in countries far distant from their place of production. This benefit brings with it an inherent problem in that plant diseases are also transported very easily. Long ago the diseases of one region were virtually unknown elsewhere, but today this is not the case, with some diseases even spreading throughout the globe.

Recently, viral infections have become the main problem in cultivated plants, especially vegetables and fruits. One of the most striking examples is that of the papaya, since the Papaya Ringspot Virus (PRV), first identified in 1945 and at first called Watermelon Virus No. 1, has become a significant problem for papaya plantations worldwide, and has brought the industry nearly to collapse in various locations, including Hawaii in 1994. This virus, which is transmitted from sick plants to healthy ones by sap sucking insects, such as the common aphid (aphis spp. and mizus spp. and others), is a key concern for various reasons, the first being its lethal and destructive capacity and the speed of contagion. The second reason is that at the present time there is no cure for viral diseases in plants, and the third is that besides the papaya, this virus attacks other cultivated plants such as the cucurbitaceous family that are of great economic importance, such as watermelon, squashes and peppers. It is very dangerous to cultivate these plants near papaya plantations infected with PRV because contagion can be immediate, resulting in greatly reduced and poor quality harvests.

The inverse is also true: new papaya plantations cannot be installed near old fields of cucurbitaceous plants where PRV is present. Another problem is that the virus also attacks common weeds that may go unnoticed but that act as carriers of the virus from which it passes to cultivated plants. Yet another problem is that lack of knowledge about the disease and its function among the great majority of farmers in the world and the small number of specialists knowledgeable about the disease and the difficulty in obtaining their assistance. The result is that now practically all the tropical regions of the world are fighting this problem.

Two decades ago papaya growers resolved the PRV problem by planting their papayas in places that were free of the problem, but with the reduction of such places they have resorted to the traditional practice of applying various insecticides to kill the insect vectors of the illness. However, the speed of movement and reproduction of these insects nullifies the effectiveness of the pesticides. In actual experiments, not even the application of aphid-specific insecticides every other day for a period of 4 months was able to control the disease. This practice has thus been disproved yet no other solution has arisen. In spite of this, papaya growers continue to rely on the use of pesticides, in spite of uncertain results, and with the potential for damaging the ecosystem. Most recently in Mexico, both older antibiotics and new products of doubtful origin have been advertised to offer a cure or at least the reversal of symptoms in the sick plants, though with little or no success to date.

In more recent efforts to control the disease, two methods stand out. The first is the appearance of a genetically modified variety, called Rainbow, which is resistant to the Ringspot Virus, and was produced by a team of scientists headed by the University of Hawaii and Cornell University working together for more than a decade. They made it available in Hawaii in 1997, shortly after the risk of collapse in 1994. Although today more than 50 percent of the papaya plantations in Hawaii area are of this variety, the lack of consumer confidence in genetically modified products has prevented this variety from being completely accepted. It has lost important markets such as Japan, which before the introduction of this variety imported all of its papaya from Hawaii. Now the importation to Japan is minimal, and only of conventional papaya, since the Japanese market does not accept genetically modified papaya. Another problem with this approach are recent concerns about contamination by pollen of contiguous or nearby fields of conventional papaya. In spite of these problems, other genetically modified varieties have appeared. Some countries are developing their own genetically modified varieties. A significant drawback to many of these varieties is that they are only resistant to PRSV, while they remain vulnerable to other, less lethal but still dangerous, viruses such as the Apical Necrosis Virus, which requires constant applications of insecticides.

The second method of solving the problem, known as the Prophylactic Solution, involves a series of practices designed to slow down as much as possible the entrance in particular of the PRSV and in general of any virus into the orchard. This method was developed and is promoted by Cuban agricultural engineers specializing in the papaya. It requires cleansing the surrounding fields, eliminating possible host or carrier plants, perimeter fencing of the orchard with a border of live plants providing thick foliage, where the vectors clean their probe so that upon coming into contact with the papaya trees inside the orchard they do not infect them. It is necessary to cut the plants that show signs of PRSV and of other viruses and to maintain a constant application of insecticides to achieve the lowest possible levels of vector insects. Among the problems of this method are the difficulty in working in coordination with neighboring farmers, maintaining the living fences and accomplishing the necessary negative selection (elimination of infected plants). Although this would seem to be a favorable solution, it is difficult to impede the viruses, and in doing so correctly, to also have a normal harvest.

By way of background, fruits in nature typically develop from the ovaries of the flowers. The flowers may have feminine structures or masculine structures or both, such that there are feminine flowers, masculine flowers and those that contain both structures, which are called hermaphroditic flowers. The process of fruit formation starts with pollination, which is the transference of pollen from a masculine flower to the stigma of a feminine flower. The feminine flower must be prepared for fertilization through fecundation of the ovary, which must have one or two ova which through maturation will produce true seeds.

Pollen may be carried from one flower to the stigma of another in a variety of ways, e.g., by insects or carried by the wind. Many species of plants require pollen from different plants and this process is known as cross pollination, but some plants that have feminine or masculine or both structures in the same flower can fertilize themselves with their own pollen. The presence of feminine and masculine flowers or of flowers of both sexes does not necessarily mean a plant will self-pollinate since the ovary and the pollen may be viable at different times.

Only a few types of flowers in nature do not require pollination and fertilization to produce fruits. Such fruits are called parthenocarpic, and they do not contain seeds. In botany and horticulture, parthenocarpia means virginal fruit, and it is produced naturally in some plants and may also be induced naturally or artificially in other plants to produce fruits without fertilization of the ova in the flowers. Fruits created in this way, as stated above, do not contain seeds. Parthenocarpia occasionally occurs in nature as a mutation, but this mutation is usually considered a defect and the resulting fruits are frequently of poor quality and/or defective. Parthenocarpic fruits can be formed naturally (such as the navel orange) or artificially, by treating the flower with hormones (such as in some seedless tomatoes) or through other methods. Some parthenocarpic fruits have attained an extraordinary commercial value, such as in the case of the triploid watermelon, which does not contain seeds and is greatly preferred by consumers since it eliminates the inconvenience of removing the seeds when eating it.

Existing scientific literature regarding parthenocarpic papaya fruit in general is very poor, and regarding the maradol in particular is even less extensive. The few authors who write about it concur that parthenocarpic fruit is not recommended for commercial purposes due to the inconsistency in the way fructification occurs, which greatly diminishes the harvest. Other authors consider the almost universal smaller size and the supposed general bad quality to be a defect or error in fructification.

Finally, the Maradol is a papaya that was developed between 1938 and 1956 by the self-taught Cuban phytogeneticist, Adolfo Rodriguez Rivera, with the help of his wife, Maria Nodals. (The name Maradol was formed by combining the first letter of their names.) There are two types, the yellow and the red. The red type was introduced into México through research institutions in the 90's, and from there it became known in other parts of the world. For that reason technical and commercial reports say that it is from Mexico. Almost from its introduction it captured the attention of consumers for its organoleptic qualities, while marketers of papaya recognize its commercial qualities. At the present time, 80% of the area cultivated in papaya in Mexico is devoted to this variety, giving a strong boost to its production and placing it as the second producer in the world. This variety amply dominates the Mexican market, and here in the United States it captures ¾ parts of the market, which totals 300 million pounds annually. All of this Maradol fruit is imported from Mexico. It is very little known in Europe and in Asian countries. It is cultivated in Cuba and other countries of the Caribbean, Central and South America, and its expansion to the rest of the world is continuous. Among connoisseurs it is considered a fine papaya and a strong competitor in the world market.

Conventional processes for the production of Maradol Papayas typically involve cultivation under the open sky with a spacing between rows of plants of 2.5 to 3 meters and between 2 and 2.5 meters between plants within each row, with a density of 1330 to 2000 plants per hectare. Circular watering throughout the rows or drip irrigation is used, resulting in harvests of between 30 and 120 metric tons per hectare, depending on the level of technology used. The control of plagues and diseases is accomplished through abundant applications of chemical pesticides, and the nutrition is based on synthetic fertilizers. Weeding is manual, mechanical or with chemical herbicides. There is a constant risk of viral infections.

BRIEF DESCRIPTION OF THE DRAWING

In the Figures.

SUMMARY OF THE INVENTION

Figure 1:
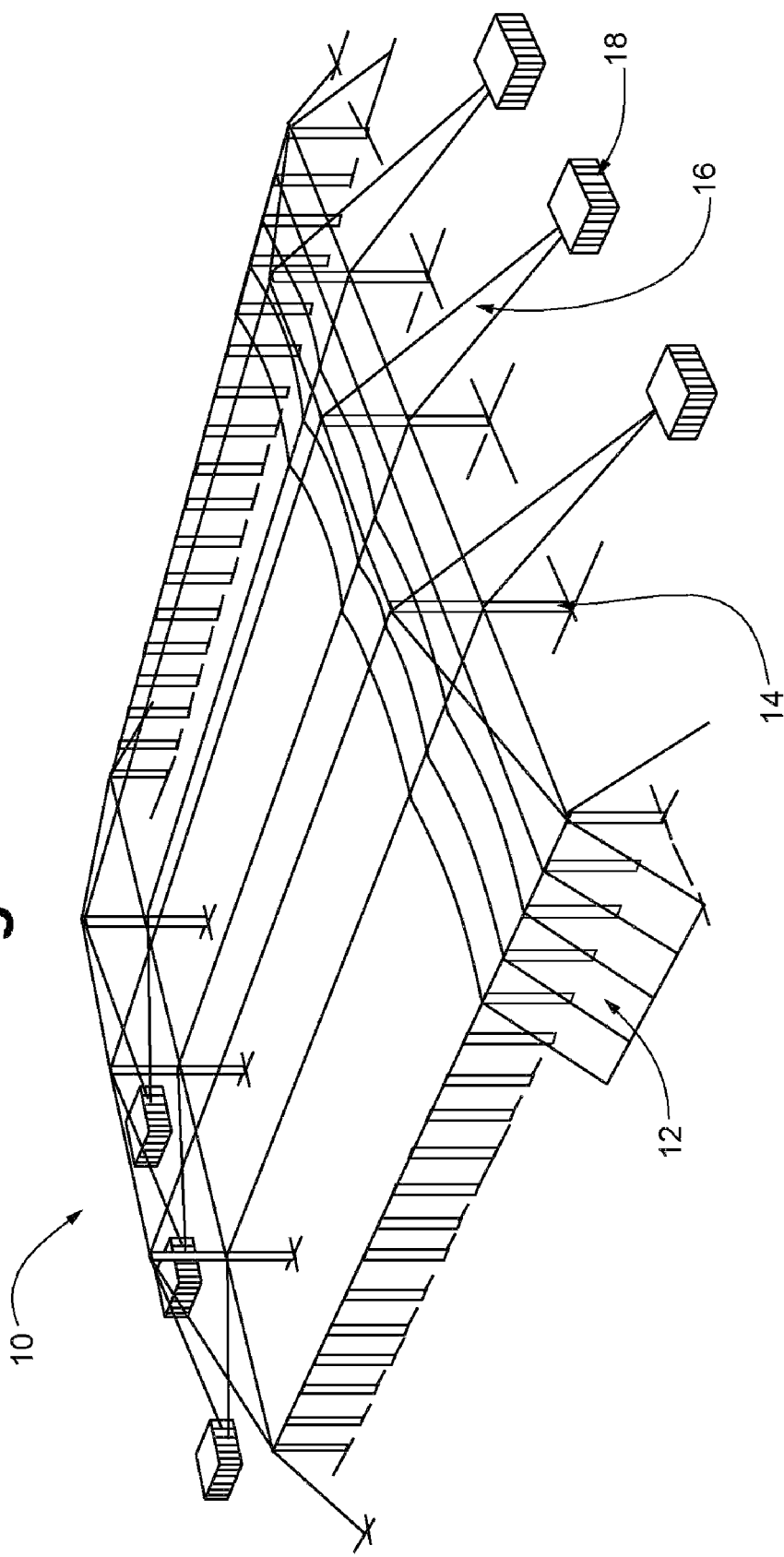
FIG. 1 provides a diagram of a representative structure as described herein.
Figure 2A:
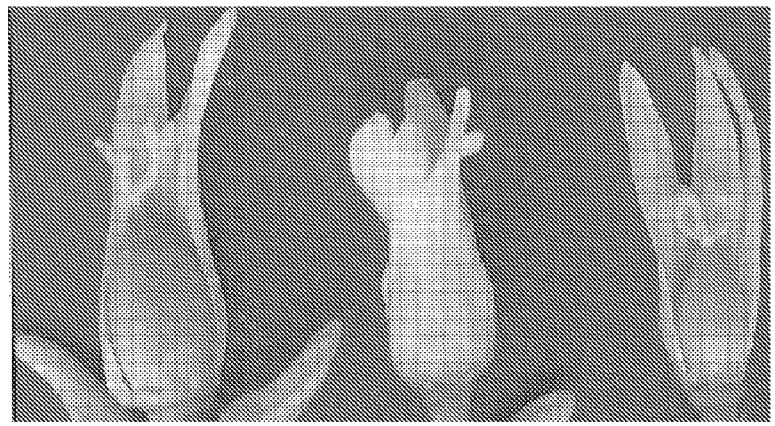
FIG. 2 includes photographs showing the various flowers that can be obtained by the growth of a Maradol papaya.
Figure 2B:
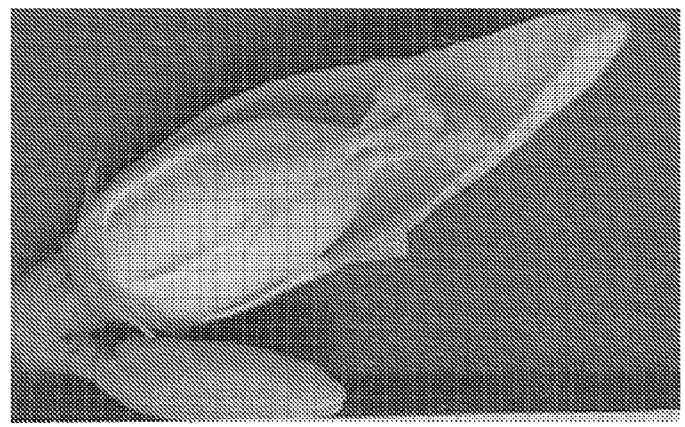
Figure 2C:
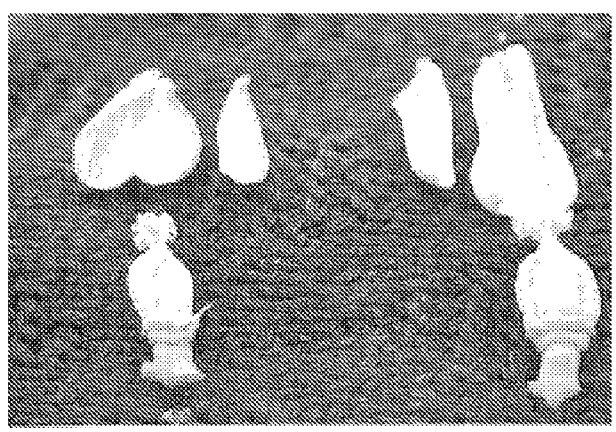
Figure 2D:
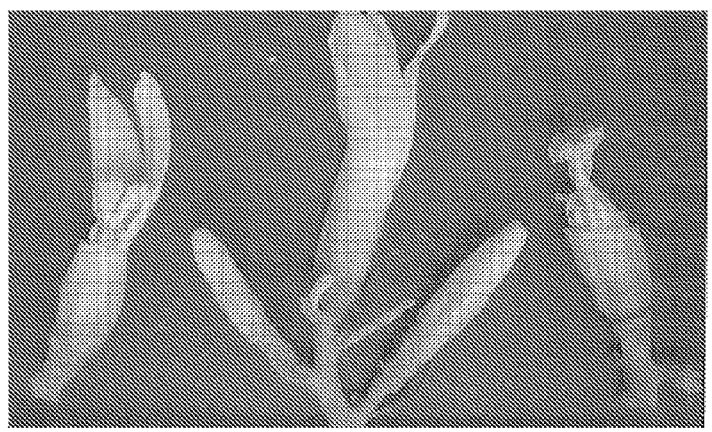
Figure 2E:
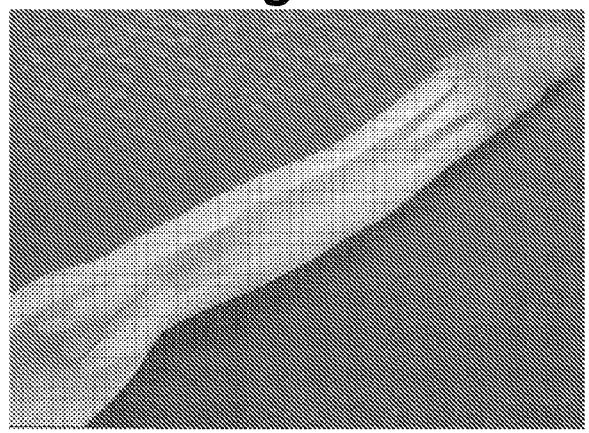
Figure 2F:
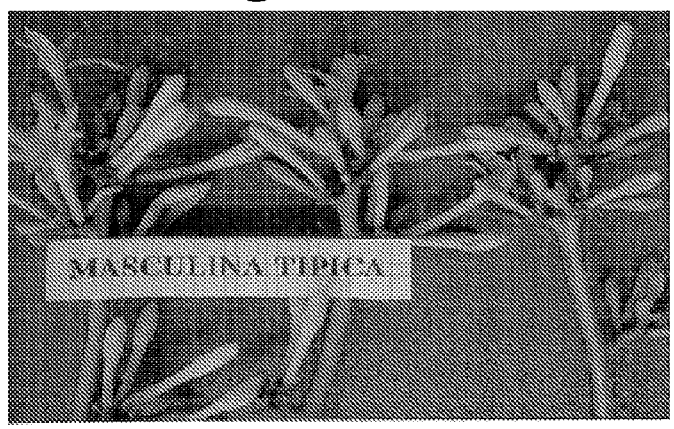

The present invention provides a method and system for growing fruits such as papayas that provides an optimal combination of such properties as cost, yield, and freedom from virus infection. In a preferred embodiment, the invention provides a method of growing fruit such as papaya commercially, the method comprising the steps of:

a) providing a structure having a covering adapted to permit sufficient light, nutrients and moisture, while substantially precluding access by potentially virus-carrying insects;

b) providing fruit seeds, preferably papaya seeds, and more preferably maradol variety (*Carica papaya*);

c) germinating the seeds;

d) planting the germinated seeds within the structure with a predetermined spacing and density; optionally within tracks designed to concentrate soil and nutrients;

e) mulching and/or fertilizing the planted seeds;

f) optionally shielding the plants with ground cover to prevent weed and grass growth and/or to reflect light;

g) permitting the germinated seeds to grow to small plants;

h) selecting hermaphroditic plants and removing female plants;

i) growing the plants to bear seedless fruit, and j) harvesting the fruit.

The system can include, for instance, the use of physical barriers to impede the contact with any sap-sucking insects that might possibly be vectors of viral infections. Use of physical barriers such as anti-aphid netting or fabrics against vector insects that transmit viral infections results in substantially complete protection against any viral infection transmitted by insects or other sources.

Applicant has discovered, among other things, that the Maradol variety forms parthenocarpic fruits (without need for pollination) in a stable and continuous way when there is no pollinating agent, contrary to what the specialized scientific literature says.

The fruits of this type are of high quality, perfectly marketable and with the advantage of lacking true seeds, which is a great advantage to the consumer. To the best of Applicant's knowledge, no such fruit is currently grown or sold on a commercial basis.

The method and system of this invention therefore provide for the cultivation of fruit such as Maradol papaya plants or trees free of any viral infections transmitted by sap-sucking insects, in manner that permits the production of papaya fruits formed parthenogenetically and continuously, that are of high quality and without seeds, and that are well-suited for commercial development.

Additional benefits of the method and system of this invention include: a) the avoidance of insects through use of the protective netting significantly reduces the use of insecticides; b) the covering facilitates the regulation of the interior temperature and humidity, allowing production in subtropical areas; c) this technology can be applied to the cultivation of other tropical and subtropical crops.

DETAILED DESCRIPTION

The method and system of this invention can involve any or all the following aspects: a) the use of high genetic quality seeds having a genotype and phenotype typical to the Maradol fruit, b) the rapid germination of the seeds, c) planting and growth of seedlings under anti-aphid covering, d) production of fruit under a thermal anti-aphid tent, e) special nutrition based on compost and organic nutriment, and/or fertilization, and f) a system of zero tolerance for weeds within the tent.

A suitable structure (10) is provided in the diagram of FIG. 1, in which a suitable cloth like barrier (12) is held in place above the plants by means of a corresponding series of braces (14) which can be provided in wood, plastic, metal or combinations thereof, and are themselves held in position by the use of cables (16) or other suitable means, here shown tethered to the ground by means of connectors (18).

High genetic quality seeds, such as papaya seeds, can be purchased on the seed markets of Mexico and the United States. The process for germination of the seeds, as provided herein, was developed to obtain seedlings ready for transplant in a fraction (e.g., one-half) the time compared with the conventional process. The following steps can be used in a process of preparing papaya seeds. Those skilled in the art, given the present description, will understand the manner in which the method and system of this invention can be applied to the growth of other fruit seeds, and to other varieties than Maradol.

Step 1: Elimination of the Arilo of the Seed:

The seeds to be used for germination are washed for 15 minutes under a current of lukewarm water in a strainer with openings smaller than the seeds. The seeds are softly rubbed against the strainer by hand while the current of water is running over them to eliminate the arilo (gelatinous covering of the seeds). After 15 minutes of washing, the great majority have lost the arilo. The seeds with a tougher arilo are separated from the rest and spread out on a well-moistened clean towel. They are rubbed against the towel by hand until the all the arilos have been eliminated.

Step 2: Elimination of the Useless or Non-viable Seeds.

Immediately following the elimination of the arilo, all the seeds are put into a container of clean water, covering them completely to a depth of 4 centimeters. After 6 or 8 hours in the water the seeds absorb the water and a process of separation occurs. Viable seeds, that are good for germination, will remain in the bottom of the container while the worthless or non-viable seeds float to the surface of the water, where they are gathered and eliminated.

Step 3: Softening the Shell of the Seeds:

The viable seeds are kept in water for five more days, with the water being changed every 24 hours. On the fifth day a conventional or organic fungicide is added to the water to prevent the development of mold. At the end of the fifth day the water is drained off and the hydrated seeds are immediately placed in plastic saucers in groups of 200 to 300 seeds, which are in turn kept in an incubator that has been previously brought to the desired temperature (e.g., heated directly under the sun on a sunny day). By this time the shell of the seeds is completely softened.

Step 4: Sprouting of the Plumule (Primary Bud):

The seeds are kept in the incubator from the sixth to the eighth day, without ever being uncovered. They are exposed to intense sunlight for four or six hours. After this time, the incubator is uncovered and a small opening will be seen in the shell of the seed, within which a white point can be observed, which is a very tiny vegetative growth. This is the plumule or sprouting of the root, and is the exact time when the seed should be placed in the pot for the development of the tiny root that will maintain and nourish the future seedling or plant.

Planting the germinated seeds, and growth of seedlings under anti-aphid covering can be accomplished in the following manner:

Step 1: Planting of the Pre-germinated Seeds (Seeds with Plumule):

The flowerpots are prepared ahead of time with a substrate that is sterilized and moistened with steam. On the surface of this a small opening is made as a receptacle for the seed. The opening should be in the center and as deep as two times the size of the seed and a little wider than the diameter of the seed. In order to handle the seeds for planting the following equipment is recommended: surgeons gloves, sterilized tweezers, and a sterilized and well-moistened cotton hand towel.

A saucer of seeds is removed from the incubator and immediately wrapped in the wet towel. In order to avoid loss of moisture in the seeds the towel is folded at one end in order to leave an opening through which the seeds with a white point or plumule can be removed one by one with the tweezers and placed in the opening in the substrate, avoiding any contact of the tweezer with the substrate in order not to drag any of it back to the seed-containing saucer. Once the seed has been deposited, the hole is covered with the same substrate and immediately watered. All of the seeds with a plumule from all of the saucers are planted. The saucers containing the seeds without plumules are returned to the incubator. Within two or three days they will have developed their plumules and may be planted. The flowerpots are placed under the anti-aphid covering.

Step 2: Growth of the Seedlings:

For the first eight days the pots are watered in the morning and in the afternoon. The next ten days they are watered only in the afternoon. The pots should at all times remain totally covered by the anti-aphid netting. The entrance to the covering should be with a double door having immediately closure in order to avoid the entrance of any insects.

This process takes a maximum of 30 days from the removal of the arilo until the plants reaches three inches in height and are ready for transplant to the ground. Maintenance of the plants under cover of the netting guarantees that they will be free from viruses, and the sterilization by steam of the substrate guarantees protection against molds in the soil. The percentage of plants achieved is 95% of the seeds originally planted.

For one hectare of land 10,000 pots must be planted, of which 500 plants will not survive, for various reasons. Nine thousand plants will be brought to the actual ground. For the 1% that will not take root, new plants will be transplanted from the incubator. The 500 remaining plants will be transplanted to larger pots and will be kept in the incubator until flowering. By contrast, the conventional process for preparing the seedlings for transplant can take from 60 to 70 days with 65 to 70% of the plants surviving, and with the risk of having virally infected plants.

Production of papaya fruits within a thermal-antiaphid tent can be accomplished in the following manner:

Step 1: Installation of the Thermal-Antiaphid Tent:

The thermal-antiaphid tent is a complete covering of fabric/netting supported by metal posts and steel cables. It functions in two ways, both as an effective protection from insects that transmit viral infections in the papaya and from other types of harmful insects and animals, and also as a regulator of extremes of temperature, light, wind and humidity, which might disturb the optimal development of the plants.

The anti-aphid netting covers the entire structure. In one preferred embodiment, the netting is woven with the weft in a rectangular pattern (rectangular openings). It is woven of high-density crystal- or white-colored 0.8 mm.—diameter monofilament polyethylene thread. It has a woof of 25×40 threads per square inch, and protection against ultraviolet rays. An unwoven fabric can be used within the tent to control the temperature, particularly to protect the plants from low temperatures at night. A particularly preferred fabric is unwoven white polypropylene, with protection against ultraviolet rays, sold as the commercial brand Agribon, though those skilled in the art will be able to incorporate and use new and better netting materials as they become developed, and as may be suitable for their particular purposes.

Step 1A: A Metallic structure and cable system is installed in order to support the netting and fabric. Specialized companies sell this equipment and provide assistance in installation. The structure is the semi-suspended type (as shown in the drawing).

Step 1B: The anti-aphid netting is put in place (as shown in the drawing). Companies that manufacture this type of netting can provide assistance in installation.

Step 2: Construction of the Planting Boxes or Tracks:

The planting tracks are rectangular containers made of wooden supports and plastic walls. They are each 1.5 meters wide by 52 meters long and 0.7 meters high, and they are preferably orient north-south. Each row has two planting tracks separated from each other by a four-meter-wide "street" that is perpendicular to them. Between rows of planting boxes there is a separation of 0.5 meters, called a "street."

Soil and/or compost and/or aged manure and other organic materials that are highly nutritive for the plants are placed in the boxes to a depth of 30 cm before the transplanting of the seedlings. Afterward they will slowly fill up from weekly or biweekly applications of the same materials until the plants have completed their life cycle. In one hectare (2.47 acres) there can provided 50 rows of planting boxes with 2 boxes in each row.

Step 3: Planting in the Planting Boxes:

In each planting box two papaya seedling are planted, separated by 15 cm and at a distance of 1.15 meters, so that each 52-meter-long planting box receives 90 seedlings at the time of transplant and each row of 2 planting boxes, 180 seedlings. The total at the time of transplant should be 8000-10000 seedlings in one hectare. Maximum cost effective production can be achieved using an optimal combination of nutrition and means for concentrating the nutrition.

Step 4: Selection of Productive Plants or Trees:

Two months after planting of the seedlings, the plants reach 60 cm in height and the first flowers appear. The flowers indicate the sex or the sexes of each plant. In the Maradol variety 66% are hermaphroditic (two sexes in one plant), while 33% are feminine and the remaining 1% are masculine or sterile.

The flowers in the Maradol variety are grouped into six types, which can be seen in the photographs provided in FIG. 2, namely:

Type 1: (I) Feminine Flower (FIG. 2(a))
Types 2 to 5: Hermaphroditic Flower (FIGS. 2(b)-2(e))
Type 6: Masculine Flower (FIG. 2(f))

These floral forms give 15 types of trees according to their type or combination of types. The form of the fruit varies according to the flower type. The fruits with the greatest commercial attractiveness are those that originate from the elongated hermaphrodite flowers (FIG. 2(D)). For that reason, only plants with this type of flower are selected. Fortunately, this type is the great majority among the hermaphrodites.

From the two plants placed in each point the one that has elongated hermaphrodite flowers is selected. If both have this type of flower, the one with the best foliage is allowed to remain and the other is cut off at soil level. If neither of the plants fills this condition both are cut off at soil level and are replaced with plants grown in the greenhouse to the point of flowering, and which have the desired elongated flower. Only one plant is put in each position.

In this manner, 100% of the fruit originates from the elongated hermaphrodite flowers, which is optimal for marketing purposes. After the beginning of flowering and the selection of the type of plant, leaving one and cutting the other in each position, there should be 4000-5000 plants per hectare.

Special nutrition can be applied based on compost, manure, fertilizer and/or organic nutriments. The primary or principal root supports the plant. It is branching and tuberous, with a great number of secondary roots that have numerous absorbent threadlike root hairs that capture nutrients and are located within the first 60 cm of the nutritive soil. This type of root makes it possible to stimulate the proliferation of many secondary roots from the primary root, and above all, abundant absorbent threadlike root hairs.

An adult papaya plant can have a radial root as large as six meters in diameter, and secondary roots that go very deep in their search for nutrients. However, in the planting box system the nutrients are nearby and abundant. The constant weekly or biweekly addition of compost and organic nutrients to the planting box permits the stimulation of rootlets not toward the depths or great distances, but at the surface and nearby.

System of "Zero Tolerance" for weeds within the thermal-antiaphid tent:

In the method and system of this invention, it is more practical, economical and healthy to avoid the growth of weeds within the thermal antiaphid tent than to allow them to sprout and grow and then to eliminate them. Weeds rob nutrients and living space and they facilitate the proliferation of insects in the interior of the tent, which might be damaging to the papaya plants. The technique of weekly or biweekly applications of compost to the planting boxes covers the recently sprouted weed seedlings, preventing their growth. The second step is to completely cover the nutritive soil or compost with two layers of double Agribon linen. The first cloth, which remains in contact with the nutritive soil is black to block light. The second cloth is white, to reflect the sunlight filtered through the antiaphid netting to the interior of the tent. Some of the light reflected by the Agribon is captured by the papaya plants. The two layers of double linen are extended the entire length of the planting box. Plastic tubing along each side of the box facilitates their placement and constant repositioning, while the line of papaya plants goes down the center of the planting box. The "streets" also are covered with the double layer of Agribon linen to prevent growth of weeds there. As the plants grow and the leaves cover the free space, the sprouting of weeds decreases.

Installation of watering system: A system of self-refilling drip irrigation is installed, having a capacity of up to 4 liters of water dripped per hour. The line is installed along either of the sides of the planting box and the drip hose or hoses (if there are two) prevents the loss of moisture by evaporation and notably reduces the relative humidity which is a cause of fungal illnesses in papaya plants.

The presence of disease-carrying insects is notably reduced, as are fungal diseases, due to the sterilization of the soil and the control of the temperature. The prevention and control of both can be accomplished through the use of conventional products or organic products, of course, with fewer applications than in the traditional open-air system of cultivation. Harvesting is manual, as is the selection and packing.

Cultivation of Maradol papaya with this system makes it possible to obtain 400 metric tons of parthenogenic Maradol papaya fruits (without seeds) of exceptional quality for the market, in a period of 18 months.

What I claim with my invention is:

1. A method of cultivating fruit comprising the steps of
   a) providing a structure having a covering adapted to permit sufficient light, nutrients and moisture, while substantially precluding access by potentially virus-carrying insects;
   b) providing ungerminated or germinated fruit seeds;
   c) planting the ungerminated or germinated fruit seeds within the structure with a predetermined spacing and density; and planting the seeds within tracks designed to concentrate soil and nutrients;
   d) mulching or fertilizing the planted seeds, so as to permit the seeds to grow to small plants, wherein the small plants are Maradol papaya plants;
   e) shielding the plants with ground cover to prevent weed and grass growth and to reflect light;
   f) selecting hermaphroditic plants and optionally removing female plants from the growing Maradol papaya plants;
   g) growing the remaining plants to bear parthenocarpic seedless fruit without the need for either plant breeding or genetic manipulation, and
   h) harvesting the seedless fruit.

2. A method according to claim 1 wherein the papaya plant originates from the selection and growth of elongated hermaphrodite flowers.

3. A method according to claim 1 wherein the method permits the selection, transplant and growth of 8000-10000 seedlings in one hectare.

4. A method according to claim 1 wherein it is possible to obtain up to 400 metric tons of parthenogenic Maradol papaya fruits within 18 months.

5. A method according to claim 4 wherein the yield can be obtained substantially without the use of insecticides.

6. A method according to claim 1 wherein the structure is sufficient to substantially prevent virus infection.

7. A method according to claim 1 wherein the method provides an optimal combination of water, nutrients, temperature, humidity, and anti-viral protection.

* * * * *